(12) United States Patent
Miquel et al.

(10) Patent No.: US 6,312,098 B1
(45) Date of Patent: Nov. 6, 2001

(54) BANDING REDUCTION IN INCREMENTAL PRINTING, THROUGH USE OF COMPLEMENTARY WEIGHTS FOR COMPLEMENTARY PRINTHEAD REGIONS

(75) Inventors: Antoni Gil Miquel; Joan Manuel Garcia, both of Sant Cugat del Valles (ES); Lidia Calvo, San Diego; Emiliano Bartolomé, Sunnyvale, both of CA (US)

(73) Assignee: Hewlett-Packard Company, Fort Collins, CO (US)

(*) Notice: Subject to any disclaimer, the term of this patent is extended or adjusted under 35 U.S.C. 154(b) by 0 days.

(21) Appl. No.: 09/516,323

(22) Filed: Mar. 1, 2000

(51) Int. Cl.[7] ............................ B41J 2/145; B41J 2/15; B41J 29/38
(52) U.S. Cl. .................................. 347/41; 347/12
(58) Field of Search .................. 347/41, 16, 40, 347/43, 12

(56) References Cited

U.S. PATENT DOCUMENTS 6,050,675 * 4/2000 Bartolome ........................... 347/41
6,086,181 * 7/2000 Majette et al. ...................... 347/16

* cited by examiner

*Primary Examiner*—Thinh Nguyen
(74) *Attorney, Agent, or Firm*—Ashen & Lippman

(57) ABSTRACT

A structure of bands is associated with printhead-array image-forming elements, forming a printmask. Some band pairs are complementary. A low usage percent is stated for at least one band and a like value for another, a complement to each "at least one" band, to smooth the mask and image. The invention best sets a number N of passes, a wavenumber multiplier M for the image, and overall number B of bands N×M×2, the "2" accounting for odd and even elements; bands appear in order:

first group of M bands, odd and even, second group of M bands, odd and even,

. . .

(N−1)th group of M bands, odd and even,

Nth group of M bands, odd and even.

In another novel aspect the invention has programming for creating a geometrical structure of bands, respectively associated with the image-forming elements and constituting the printmask. The invention also has programming for specifying a relatively low usage percentage for at least one particular band that is associated with image-forming elements that are not at either of the ends of the array; and programming for applying the printmask in said printing.

17 Claims, 10 Drawing Sheets

BANDING REDUCTION IN INCREMENTAL PRINTING, THROUGH USE OF COMPLEMENTARY WEIGHTS FOR COMPLEMENTARY PRINTHEAD REGIONS

RELATED PATENT DOCUMENTS

A closely related document is another, coowned U.S. utility-patent application filed in the U.S. Patent and Trademark Office substantially contemporaneously with this document. It is in the name of Zapata, and entitled "BANDING REDUCTION IN INCREMENTAL PRINTING, BY SPACING-APART OF SWATH EDGES AND BY RANDOMLY SELECTED PRINT-MEDIUM ADVANCE"— Ser. No. 09/516,816. That document, and other related documents cited or discussed in it, are hereby incorporated by reference in their entirety into this document.

Other related documents also wholly incorporated by reference herein are other, coowned U.S. utility-patent applications filed in the United States Patent and Trademark Office generally contemporaneously with this document. One such document, pertinent for its introduction of print-medium-axis directionality ("PAD") error, is in the name of Doval, under the title "COMPENSATION FOR MARKING-POSITION ERRORS ALONG THE PEN-LENGTH DIRECTION, IN INKJET PRINTING". It was assigned provisional application No. 60/179,383; and then relied upon for its priority benefit in filing of utility-patent-application Ser. No. 09/693,524. Another such document is in the name of Garcia-Reyero, and is pertinent for its introduction of printmode techniques that enable printers to develop masks in the field, from factory-supplied kernels or algorithms, very efficiently and quickly. This document is Ser. No. 09/632,197.

Two other very closely related documents are Ser. Nos. 08/705,101 and 09/289,414 of Bartolomé, now issued as U.S. Pat. Nos. 5,929,876 and 6,050,675 respectively.

FIELD OF THE INVENTION

This invention relates generally to machines and procedures for printing text or graphics on printing media such as paper, transparency stock, or other glossy media; and more particularly to a scanning thermal-inkjet machine and method that construct text or images from individual ink spots created on a printing medium, in a two-dimensional pixel array. The invention employs print-mode techniques to optimize image quality.

BACKGROUND OF THE INVENTION (a) Overview—The latest large-format printer-plotters, and smaller desktop printers as well, have a very strong need for throughput. The principal current objectives include:

making printheads as long as possible, in the printing-medium advance direction ("PAD"), to increase the dimension of each swath in that same direction; and reducing the number of passes.

These objectives are intimately related, since the first is a primary means of accomplishing the second.

Longer heads alone, however, are not the end of the matter. Even introducing a printhead long enough to physically print with a minimum number of passes would leave many problems of printing quality unresolved.

Both the above objectives do penalize image quality, for at least three reasons. First, longer printhead is more difficult to manufacture, and has more chances for lower performance than the average in some localized area along the head. Such conditions may occur in the head when it is first manufactured, or may arise later during the life of the head.

Second, a smaller number of passes necessarily requires application of a greater ink density in each pass. Therefore ink density has a larger discontinuity at swath boundaries, and coalescence at the boundaries accordingly worsens.

Third, a smaller number of passes, in conjunction with a longer swath in the PAD direction, produces banding at lower spatial frequencies. Band patterns at these spatial frequencies is more unpleasant to the human eye.

Some recent and concurrent efforts attempt to address the swath-boundary coalescence problem. For instance, different ink-density profiles have been introduced at or near swath boundaries.

These efforts have improved performance; nevertheless, each such effort has addressed primarily just one of the three penalties just noted. Integration of solutions to all three is an objective of the present document. In addition, Joan Manel Garcia has introduced methods for generation of masks that assign different workloads to each nozzle—and this document bears on the selection of input data for use in his mask-generation method.

(b) Spatial-frequency effects in banding—A persistent problem in incremental printing is conspicuously visible banding or patterning, which arises from a great variety of causes. Generally these causes are associated with repetitive phenomena that are inherent in the swath-based natured of such printing.

Garcia, in U.S. utility-patent applications Ser. Nos. 09/150,321 through '323, particularly addresses problems of patterning in the lateral or transverse dimension, i. e. parallel to the scan axis. He points out that such patterning is especially objectionable when it occurs at spatial periodicities to which the human eye is particularly sensitive.

Garcia shows that such banding can be rendered very inconspicuous at normal reading distances by moving its periodicity to roughly 3 cm (1 inch), or preferably a bit longer. This can be accomplished by tiling printmasks of those widths.

Unfortunately that technique is not now readily applicable to the longitudinal dimension—i. e. to the direction parallel to the print-medium advance axis. The reason is that, generally, largest current-day printheads are only about 2½ cm (1 inch) long in that direction.

Within the corresponding available range of spatial frequencies, banding in the lower three-quarters of that range (used in single-pass through four-pass printmodes) is quite conspicuous. Unfortunately the current trend toward reducing the number of passes used for printing each image segment—to enhance overall printing throughput —militates toward use of precisely that part of the range.

(c) Swath-interface effects—Some banding along the print-medium advance axis arises at the interfaces between swaths—due to the advance errors and "PAD" errors mentioned above, and due to ink-media interactions such as coalescence or print-medium expansion. Earlier documents such as Doval's have pointed out that repetitive, small failures of abutment themselves introduce banding (though extremely tiny imprecisions or variations in abutment can be helpful).

Swath-abutment irregularities may represent the single most conspicuous form or type of banding effect. When one swath edge is closely abutted to another, the abutment is almost always imperfect—leading to either a shallow gap between swaths or a shallow overprint where they overlap.

Also the two swaths are generally not exactly the same in darkness or color saturation, adding another element of contrast along the interface. Such problems are aggravated by a high or abrupt gradient of wetness along the edge of a just-deposited swath, when an abutting swath is formed soon after.

So-called "PAD error" has attracted particular attention in part because some modern pens are subject to a concentration of aiming errors at the ends of the pen—most classically outboard-aimed nozzles 91 (right-hand "A" view, FIG. 7) as distinguished from the great majority of more centrally disposed nozzles 90.

This higher density of errors, with systematic outboard aim, results from the greater difficulty of maintaining TAB-tape nozzle arrays planar, in comparison with the metal nozzle plates used earlier. In some heads, particularly at the ends of the array, the tape is typically wrapped around the adjacent ends of the printhead—causing the tape to curl very slightly.

The outboard aim in pens of this type increases 93 the overall dimension of the pixel swath in the print-medium-advance axis, beyond the nominal width 92. Typically this overall increase has been on the order of two or three rows.

As a result, when adjacent swaths that should neatly abut are printed with a nominal advance of the print-medium-advance mechanism, those swaths will instead overlap slightly. This occurs because an error region 93 in one of the swaths projects into a region which should be occupied by the other swath.

(d) Internal effects—Not all banding problems, however, occur at swath boundaries. Some result simply from nozzle PAD problems, and these nozzle irregularities can be entirely internal to the swath (right-hand "B" view, FIG. 7).

Internal patterns, in turn, can be formed by repetitive coincidences of nozzle irregularities. Prior systematic procedures placed particular irregularly-performing pairs (or other groups) of printhead elements into conjunction—with respect to the printing medium—over and over.

As an example, the Hewlett Packard Company printer product known as the Model 2000C uses two-pass bidirectional printmodes—each pixel row being printed by two separate nozzles. At 24 rows per millimeter (600 dots per inch, dpi), a 12.7 mm (half inch) pen, has 300 nozzles.

Ordinarily nozzles number 1 and 151 contribute drops to the same image row—using a 6⅓ mm (quarter inch) advance and, again, a two-pass, 300-nozzle printmode. Every 6⅓ mm these same two nozzles are paired (see the above-mentioned Zapata patent document, particularly in that document FIG. 7 and the Table).

If nozzles 1 and 151 when used in combination form a noticeable band effect, this effect is highly visible to the user—because it is present in a repeating pattern, roughly every 6 mm or quarter inch. For example, if both nozzles happen to be directed well away from their nominal target pixel row, then that pixel row will appear unprinted (at least in the particular color in which the head in question prints), rather than the nominal double-printed.

Another kind of band effect can be caused by an interaction of nozzles that are adjacent or nearby. For example assume that nozzle number 5 is aimed "low" (toward the nominal target row for nozzle 6). If nozzle 6 is aimed accurately, its target row will be double-printed.

If in addition nozzle 156 is also aimed accurately but nozzle 157 is aimed "high" (i. e. both toward the target row for nozzle 156), then in the printed image the common pixel row for nozzles 6 and 156 will be quadruple-printed —while the adjacent rows above and below will each be single-printed rather than the nominal (double printed).

In short, banding within swaths results from repetitive coincidences between irregularly printing elements within each combination. Patterning arises from repetitive, systematic operation.

Objectionable patterning is subject to quantitative effects. Thus some printmasking approaches to patterning in effect simply dilute repetition within an environment of a greater number of alternative states.

(e) Multipass printmode solutions—Heretofore a common strategy for dealing with all these problems has been to increase the number of passes used to print each image segment. This strategy, however, degrades printing throughput.

It is therefore disadvantageous in the present market, which is increasingly more demanding. This marketplace is characterized by continuously escalating consumer perceptions of what constitutes an acceptable overall image-printing time.

(f) Conclusion—Thus failure to effectively address problems of banding in printmodes using low numbers of passes has continued to impede achievement of uniformly excellent inkjet printing—at high throughput. Thus important aspects of the technology used in the field of the invention remain amenable to useful refinement.

SUMMARY OF THE DISCLOSURE

The present invention introduces such refinement. Before proceeding to a relatively rigorous introduction of the invention, this section first presents an informal orientation to some insights which may in a sense have been a part of the making of the invention.

To make banding effects less conspicuous, the spatial frequency or wavenumber of the banding can be raised (i. e. the period shortened, lowered). Banding at higher spatial frequency is less visible to the human eye than banding at a low frequency.

Garcia's previously mentioned technique works because the visual response characteristic peaks—so that low frequencies, too, are less visible. For the ranges currently available with printheads 2½ cm long, and less, however, what is most effective is to resort to the higher frequencies.

Another strategy is assignment of smaller printing stress—or "workload"—to the worst-performing printhead regions. Accordingly, respective performances of regions (or individual printing elements) in the printhead are advantageously monitored over its life, and the allocation of workload modified correspondingly.

As to the previously mentioned problems associated with abutting swaths, these can be mitigated very greatly by shaping ink-density profiles into smaller discontinuities. One favorable result is to minimize swath-boundary coalescence.

None of these approaches penalizes mask smoothness. Moreover it is still possible to react to changes in performance over the life of each printhead.

In general the innovations introduced in this document achieve valuable reduction in banding without resort to large numbers of passes. In these ways the invention moves the field of incremental printing forward by enabling high image quality without degradation of printing throughput.

With the foregoing preliminary observations in mind, this summary now moves on to somewhat more-formal discussion of the invention.

In preferred embodiments of its first major independent facet or aspect, the invention is a method of generating a printmask for incremental printing of an image. The printing uses image-forming elements in an array. (The image-forming elements may be nozzles in an inkjet or bubblejet printer—or may be the analogous elements in a hot-wax transfer machine, dot-matrix printer, or other piezo- or thermally-driven system.) The method includes the step of creating a structure of bands, respectively associated with the image-forming elements and constituting the printmask. The term "bands" here, i. e. groups of one or more adjacent printing elements along the printing-element array, is not to be confused with the concept of "banding"—which refers to the appearance of horizontal striations or strips across an image printed on a printing medium.

The phrase "respectively associated" here is not meant to suggest that a single band is associated with each single image-forming element respectively, although this type of direct correspondence is encompassed within the association. More typically some number of the elements, such as (merely by way of example) five to fifty elements, make up each band.

Certain specific bands within the band structure are complementary to other specific bands within the band structure. The term "complementary" here means either geometrically related, as for instance by symmetry with respect to the overall array, or functionally related in a way that is analogous to such a geometrical relation.

This concept of complementary bands will become clear to people skilled in this field, through consideration of the examples presented in this document. Further clarification will appear from the purposes of the complementary relationship, also as set forth in this document.

Another step is specifying a relatively low usage percentage for at least one particular band. Yet another step is specifying a like relatively low usage percentage for another band that is respectively complementary to each "at least one" particular band.

The foregoing may represent a description or definition of the first aspect or facet of the invention in its broadest or most general form. Even as couched in these broad terms, however, it can be seen that this facet of the invention importantly advances the art.

In particular, the use of complementarity in structuring the duty-cycle relationships along a printhead (as defined in the course of designing a printmask) is a very powerful tool in shaping the profiles of inking density, as mentioned earlier, to obtain smaller discontinuities than possible heretofore. Mask smoothness is improved and with it the smooth blending of swath irregularities, particularly such irregularities within the printing-element array (i. e., rather than at its ends). The technique can also be employed to minimize swath-boundary coalescence.

Although the first major aspect of the invention thus significantly advances the art, nevertheless to optimize enjoyment of its benefits preferably the invention is practiced in conjunction with certain additional features or characteristics. In particular, preferably the creating step includes setting a number N of actual printing passes desired and establishing an effective spatial-frequency multiplier M desired for the image.

With these preparations then is included the step of defining an overall number B of bands, associated with the image-forming elements and constituting the printmask. This number B is equal to the product B=N×M×2, in which the numeral "2" accounts for the presence of odd and even image-forming elements, and in which the bands appear in the printmask in this order:

first group of M bands, odd and even,
second group of M bands, odd and even,
next group of M bands, odd and even,
. . .
next group of M bands, odd and even,
(N−1)th group of M bands, odd and even,
Nth group of M bands, odd and even.

When this first preference is observed, then a related secondary preference is that the complementary bands include bands that are binary opposites. In addition these binary-opposite bands are in alternate groups of the band structure as listed above.

If the related secondary preference just described is also observed, then a yet further preferred form of the invention is limited to the use of N=8 passes, and M=2 spatial-frequency multiplication. In this case there are therefore 8 groups of 2 bands, odd and even; and the complementary bands include:

the first group, odd, and the second, fourth, sixth and eighth groups, even;
the first group, even, and the second, fourth, sixth and eighths groups, odd;
the second group, odd, and the third, fifth and seventh groups, even;
the second group, even, and the third, fifth and seventh groups, odd;
the third group, odd, and the fourth, sixth and eighth groups, even;
the third group, even, and the fourth, sixth and eighth groups, odd;
the fourth group, odd, and the fifth and seventh groups, even;
the fourth group, even, and the fifth and seventh groups, odd;
the fifth group, odd, and the sixth and eighth groups, even;
the fifth group, even, and the sixth and eighth groups, odd;
the sixth group, odd, and the seventh group, even;
the sixth group, even, and the seventh group, odd;
the seventh group, odd, and the eighth group, even;
the seventh group, even, and the eighth group, odd.

Reverting to the first main aspect of the invention, another preference is that the like-low-percentage specifying step tend to smooth the mask and produce smoother output printing of the image. Another preference is that the at least one particular band be associated with image-forming elements known to be problematic in operation.

If this criterion of problematic elements is used, then preferably the at least one particular band is chosen substantially independent of location of the image-forming elements in the array. Furthermore in the "problematic element" case preferably the method includes the step of monitoring printing operation to identify the bands that are problematic.

Yet another preference, related to the first main facet or aspect of the invention, is that the at least one particular band include a band that is associated with image-forming elements which are not at either end of the array. On the other hand, in this case it is desirable that the at least one particular band also include a band which is associated with image-forming elements at at least one end of the array.

A still further preference is that the method include the step of assigning a common usage percentage to all the image-forming elements associated with each band, respectively. In this case the assigning step includes the two specifying steps.

An additional preference is that the invention form a method for printing an image using a printmask generated by the method of the first main aspect or facet of the invention. In this case the printing method includes executing plural passes of a printhead over a print medium.

Each pass forms a swath of marks on the medium. In addition the method includes, between printing passes of the printhead, stepping the printing medium by a step distance that varies as between steps.

In preferred embodiments of its second major independent facet or aspect, the invention is apparatus for generating and using a printmask for incremental printing of an image. The printing uses image-forming elements in an array, and the array has two ends.

The apparatus includes some means for creating a geometrical structure of bands, respectively associated with the image-forming elements and constituting the printmask. For purposes of generality and breadth in discussing the invention, these means will be called simply the "creating means".

The apparatus also includes some means for specifying a relatively low usage percentage for at least one particular band that is associated with image-forming elements that are not at either of the ends of the array. Again for breadth and generality these means will be termed the "specifying means".

In addition the apparatus includes some means for applying the printmask in said printing. These means, for the reason suggested above, will be called the "applying means".

The foregoing may represent a description or definition of the second aspect or facet of the invention in its broadest or most general form. Even as couched in these broad terms, however, it can be seen that this facet of the invention importantly advances the art.

In particular, this second aspect of the invention is unique in addressing problems of mask smoothness and reducing associated image patterning well within the boundaries of the printing-element array.

Although the second major aspect of the invention thus significantly advances the art, nevertheless to optimize enjoyment of its benefits preferably the invention is practiced in conjunction with certain additional features or characteristics. In particular, preferably the apparatus further includes some means for monitoring operation of the image-forming elements—in this document identified as the "monitoring means".

In this case the apparatus also preferably includes companion means for identifying image-forming elements whose operation is problematic—and for controlling the specifying means to specify a band associated with the problematic-operation image-forming elements. The latter elements function, in this case, as the "at least one" particular band.

The means under discussion in the preceding paragraph will be called "identifying means". They are responsive to the monitoring means.

When the preference just described is in use, a further preference is that the apparatus also include some means for specifying a relatively low usage percentage for at least one particular band that is associated with image-forming elements that are at one or the other of the ends of the array. The combination of improving image quality both within and at the ends of the array is considered particularly potent.

Another preference related directly to the second main aspect of the invention is that the apparatus further include some means defining an optimized multipass printmode having nonconstant media advance among passes. In this case also the optimized multipass printmode uses the printmask.

In this latter case, a still further preference is that the apparatus include a printhead, and some means for passing the printhead over a printing medium multiple times, each pass forming a swath of marks on such medium. In this case the printmask includes some means for spacing edges of each swath well away from edges of substantially every other swath so that substantially no two swath edges coincide on the medium.

All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

1. The Printer Mechanism

Figure 1:
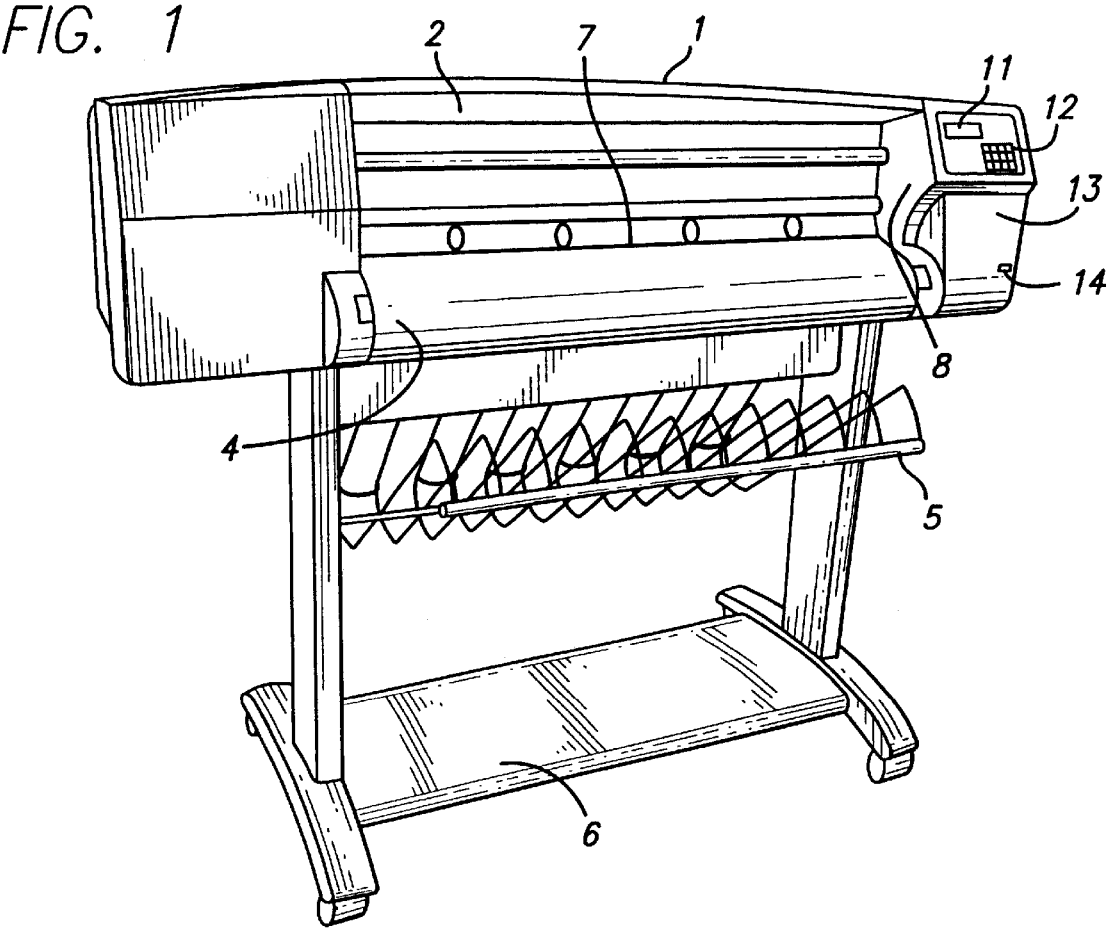
FIG. 1 is a perspective or isometric view of a printer/plotter that is and that incorporates one preferred embodiment of the invention—though the invention is equally applicable with respect to smaller, desktop types of printers in the consumer market.

The invention is amenable to implementation in a great variety of products. It can be embodied in a printer/plotter that includes a main case 1 (FIG. 1) with a window 2, and a left-hand pod 3 which encloses one end of the chassis. Within that enclosure are carriage-support and -drive mechanics and one end of the printing-medium advance mechanism, as well as a pen-refill station with supplemental ink cartridges.

The printer/plotter also includes a printing-medium roll cover 4, and a receiving bin 5 for lengths or sheets of printing medium on which images have been formed, and which have been ejected from the machine. A bottom brace and storage shelf 6 spans the legs which support the two ends of the case 1.

Just above the print-medium cover 4 is an entry slot 7 for receipt of continuous lengths of printing medium 4. Also included are a lever 8 for control of the gripping of the print medium by the machine.

A front-panel display 11 and controls 12 are mounted in the skin of the right-hand pod 13. That pod encloses the right end of the carriage mechanics and of the medium advance mechanism, and also a printhead cleaning station. Near the bottom of the right-hand pod for readiest access is a standby switch 14.

Within the case 1 and pods 3, 13 a cylindrical platen 41 (FIG. 2)—driven by a motor 42, worm 43 and worm gear 44 under control of signals from a digital electronic processor—rotates to drive sheets or lengths of printing medium 4A in a medium-advance direction. Print medium 4A is thereby drawn out of the print-medium roll cover 4.

Meanwhile a pen-holding carriage assembly 20 carries pens back and forth across the printing medium, along a scanning track—perpendicular to the medium-advance direction—while the pens eject ink. The medium 4A thus receives inkdrops for formation of a desired image, and is ejected into the print-medium bin 5.

As indicated in the drawing, the image may be a test pattern of numerous color patches or swatches 56, for reading by an optical sensor to generate calibration data. For present purposes, such test patterns are for use in monitoring for and detecting printing elements (e. g. nozzles) that are performing poorly or not at all.

A small automatic optoelectronic sensor 51 rides with the pens on the carriage and is directed downward to obtain data about pen condition (nozzle firing volume and direction, and interpen alignment). The sensor 51 can readily perform optical measurements 65, 81, 82 (FIG. 10); suitable algorithmic control 82 is well within the skill of the art, and may be guided by the discussions in the present document.

A very finely graduated encoder strip 36 is extended taut along the scanning path of the carriage assembly 20 and read by another, very small automatic optoelectronic sensor 37 to provide position and speed information 37B for the microprocessor. One advantageous location for the encoder strip 36 is immediately behind the pens.

A currently preferred position for the encoder strip 33 (FIG. 3), however, is near the rear of the pen-carriage tray—remote from the space into which a user's hands are inserted for servicing of the pen refill cartridges. For either position, the sensor 37 is disposed with its optical beam passing through orifices or transparent portions of a scale formed in the strip.

The pen-carriage assembly 20 is driven in reciprocation by a motor 31—along dual support and guide rails 32, 34—through the intermediary of a drive belt 35. The motor 31 is under the control of signals from the digital processor.

Naturally the pen-carriage assembly includes a forward bay structure 22 for pens—preferably at least four pens 23–26 holding ink of four different colors respectively. Most typically the inks are yellow in the left-most pen 23, then cyan 24, magenta 25 and black 26.

Another increasingly common system, however, has inks of different colors that are actually different dilutions for one or more common chromatic colors, in the several pens. Thus different dilutions of black may be in the several pens 23–26. As a practical matter, both plural-chromatic-color and plural-black pens may be in a single printer, either in a common carriage or plural carriages. Also included in the pen-carriage assembly 20 is a rear tray 21 carrying various electronics. The colorimeter carriage too has a rear tray or extension 53 (FIG. 3), with a step 54 to clear the drive cables 35.

Figure 2:
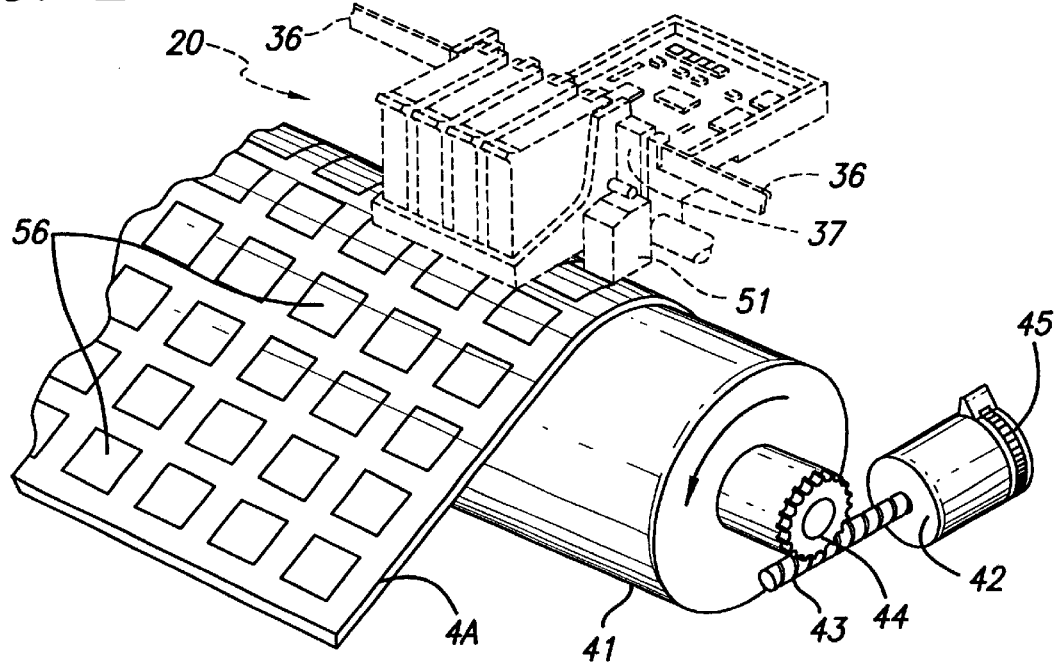
FIG. 2 is a like view, but enlarged, of portions of a printing engine—particularly including the printing-medium advance mechanism—within the FIG. 1 printer plotter.
Figure 3:
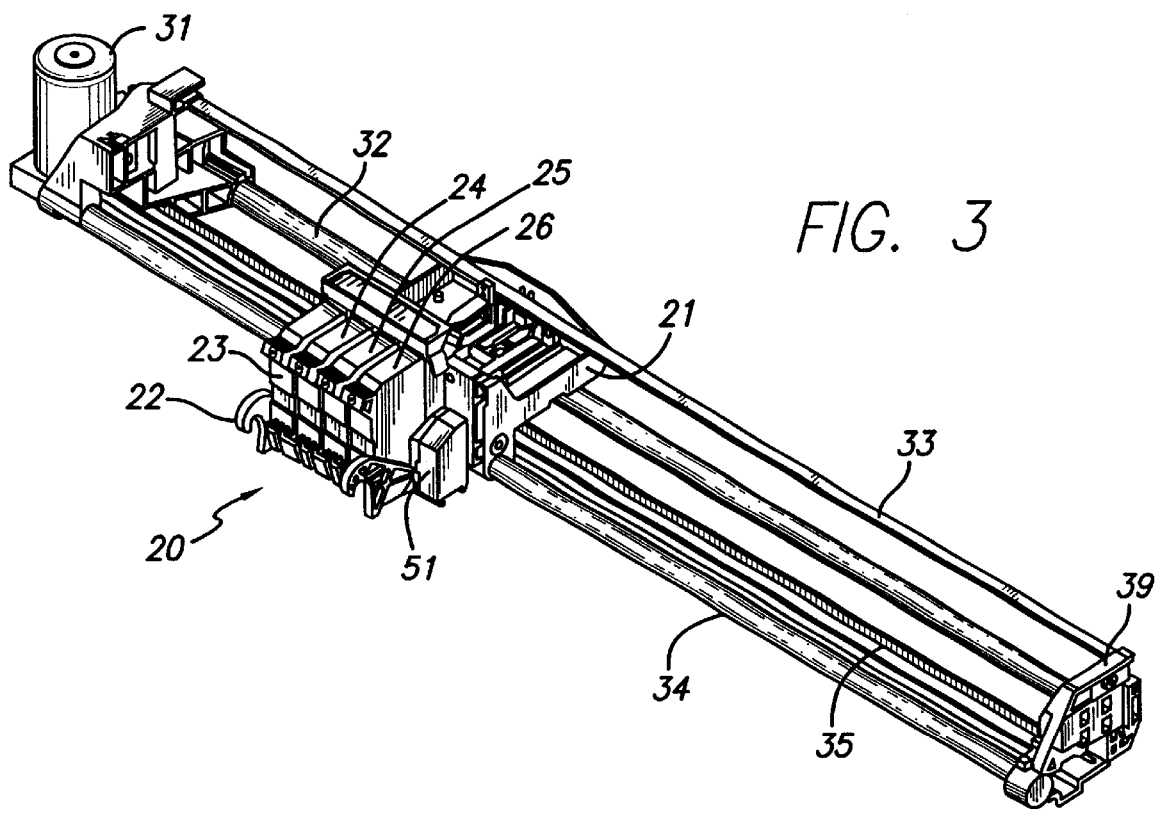
FIG. 3 is a like view, but somewhat less enlarged, of a bigger portion of the print engine.

FIGS. 1 through 3 most specifically represent a system such as the Hewlett Packard printer/plotter model "DesignJet 2000CP", which does not include the present invention. These drawings, however, also illustrate certain embodiments of the invention, and—with certain detailed differences mentioned below—a printer/plotter that includes preferred embodiments of the invention.

2. Raising spatial Frequency; Offsetting Swath Boundaries

For further preliminary orientation, this section now introduces a representative implementation of the preferred embodiments of the present invention. Preferred embodiments themselves are discussed in section 3 below.

The present section corresponds to portions of the Zapata patent document mentioned earlier. Further details are available in that document.

This implementation varies the distance by which the print medium is advanced, in plural-pass printmodes. The advance is best changed frequently—in fact, most often it is changed between each pair of successive passes.

The point is to create a greater number of different locations for the edges of swaths. Following is an example for a three-pass printmode: the first operation described will be a three-pass mode that is conventional.

Figure 4:
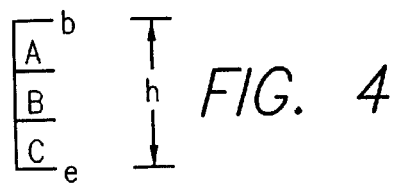
FIG. 4 is a diagram, highly schematic, of the printing-element (e. g. nozzle) array of a representative printhead, as it would be effectively subdivided for a conventional three-pass printmode—and also corresponding to the subdivided structure of a single resulting printed swath on a printing medium, with the heights of the consistent pixel advance and fixed printing-medium advance.

In considering such a mode, it is helpful to think of the dimension h (FIG. 4) of the printed swath in the printing-medium-advance axis (which is roughly the same as the printhead height) as divided into three equal segments A, B and C. The three respective equal heights of these printed swath segments are the printing-medium and data advances.

The beginning b and end e of the swath are formed by the two ends of the overall printhead. As successive passes occur, inking is completed progressively for each swath segment.

For instance segments A, B and C are each partially inked during a first pass (FIG. 5) of the present example. Previous inking in the upper two segments A and B occurs in earlier passes, and the example here picks up with a representative segment C.

Figure 5:
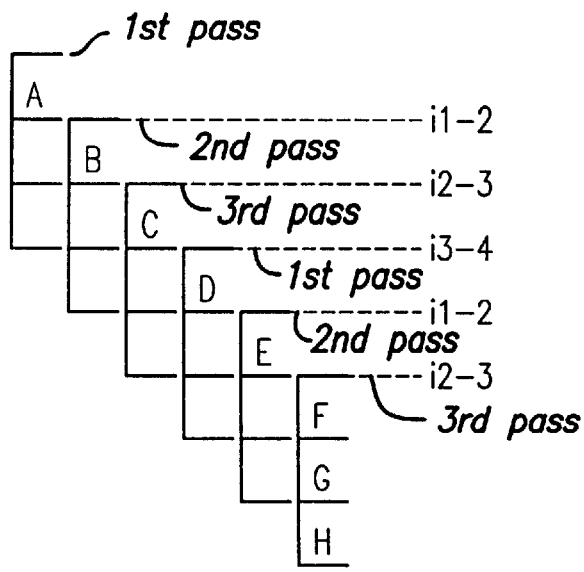
FIG. 5 is an analogous diagram of six printed swaths as formed using the FIG. 4 conventional three-pass mode.

The first pass shown in FIG. 5 is also the first pass in which segment C receives any ink. In a second pass, swath segments B, C and D are each partially inked; and in a third pass, swath segments C, D and E are each partially inked.

In the next "first pass"—i. e. in the first pass of the second cycle shown in FIG. 5—segments D, E and F are each partially inked. Hence segment C receives no ink at all in this pass; in other words, after the third pass, inking of segment C is finished.

Therefore it can be appreciated that segment C is completely inked, from start to finish, in three passes—namely, the first, second and third passes of the first cycle. Each of these passes provides one-third of the total inking for segment C.

Each of the other segments D, E, F, G and H (and A and B as well) similarly is inked in three passes—cycling between the numbered passes in the drawing thus: 123, then 231, 312, and then starting again with 123. Furthermore each pass is inked by the same groups of printing elements (nozzles). Each pass provides one-third of the total colorant placed on the printing medium.

The interfaces (dashed horizontal lines i1-2, i2-3, i3-1) between passes appear at a spatial periodicity of a third of the swath height. The spatial periodicity may also be expressed in reciprocal terms—that is, in terms of spatial frequency or wavenumber. Thus expressed, the value (measured in "per-swathheight" units) is the reciprocal of the period—namely, three.

At each of these interfaces, the end of one swath coincides with the beginning of another. For instance at interface i3-1 the topmost full swath A-B-C ends and swath D-E-F begins. Banding effects related to swath boundaries accordingly have wavenumber 3 per swathheight (this may be written 3/swathheight, or 3 swathheight$^{-1}$).

Now to compare with this conventional fixed-advance three-pass mode, a variable advance can be used to double the spatial frequency of the banding. Both the underlying three-pass operation and the doubling of frequency are examples only; other frequency multiples as well as other numbers of passes are possible.

Figure 6:
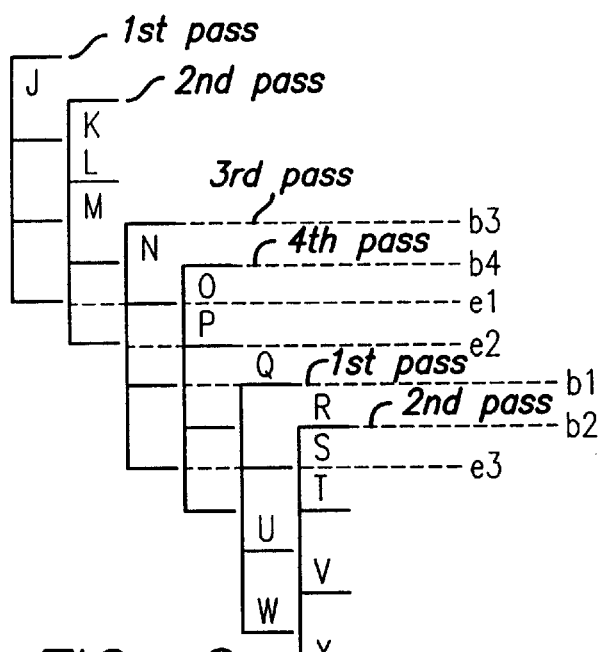
FIG. 6 is a diagram like FIG. 5 but for a three-pass mode according to one preferred embodiment of the present invention, using two systematically selected different advance distances in alternation—the successive passes in this drawing being shown offset slightly from left to right for clarity only, as they are arrayed in a common vertical alignment when actually printed.
Figure 7:
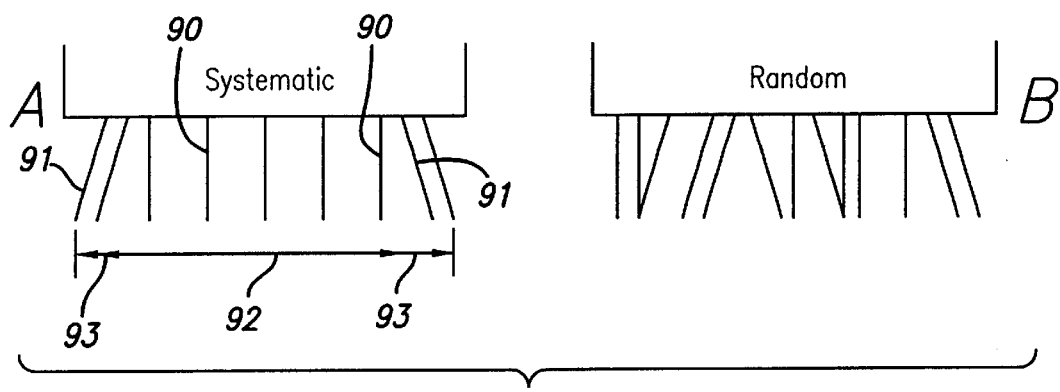
FIG. 7 is an elevational diagrammatic showing of a nozzle array with systematic outboard-aiming PAD error in the "A" view and with currently more representative random PAD error in the "B" view.

Swath segment A will now be identified as two narrower segments J and K (FIG. 6). Remaining segments, too, are subdivided due to the effects of the printhead positions illustrated—yielding segments N through X—or previously printing positions not shown, to produce segments L and M.

To achieve this frequency doubling in a three-pass mode, the advance differs between each successive pair of passes. In the example, the stroke alternates between advancing ⅙ of a swath (as from the first pass to the second) and ⅜=½ of a swath (as from the second to the third).

This way the swath ends e1, e2, e3 and beginnings b3, b4, b1, b2 never coincide. Instead each swath end or beginning always stands alone, so that these features occur at a one-sixth spatial periodicity—or in other words with wavenumber 6/swathheight.

In addition, there are now regions of the swath that are completed by two, or three, or four passes: for example two for segment Q; three for N, P, R and T; four for O and S. In other words, for the illustrated printmode the regions of the image are filled by cycling between passes thus: 12, 123, 1234, 234, 34, 3412, 12, 123 . . . . The number of possible combinations of nozzle groupings that print a region of the swath is larger (seven rather than only three).

The scheme described here produces not only doubling of the spatial frequency but also—for a printmode with any odd number of passes—elimination of coincident swath beginnings and ends. Variation of advance can produce not only doubling but other spatial-frequency multiplications too. The procedures outlined in this section offer several benefits, and a possible drawback, all discussed at some length in the earlier-mentioned Zapata document.

3. Complementary Weighting of Printhead Regions

The present invention deals with the construction of printmasks. The main principle consists of dividing the mask into N×M×2 horizontal bands, and assigning a constant usage to each of the bands. To illustrate this, some examples follow.

EXAMPLE ONE

8-Pass Mask that Minimizes Swath-Boundary Coalescence

If we only want to make a mask that puts less ink at the swath boundaries for an 8-pass printmode and want to make it look like a 16-pass printmode, we break the mask up into 8×2×2 horizontal bands. This stands for 8 passes, having 2× apparent banding frequency and specifying separately the odd from the even nozzles.

We may assign weights to each band:

| Swath band   | 1a   | 1b   | 2a   | 2b   | 3a   | 3b   | 4a   | 4b   |
|--------------|------|------|------|------|------|------|------|------|
| Odd nozzles  | 600  | 1000 | 1000 | 1000 | 1000 | 1000 | 1000 | 1000 |
| Even nozzles | 600  | 1000 | 1000 | 1000 | 1000 | 1000 | 1000 | 1000 |
| Swath band   | 5a   | 5b   | 6a   | 6b   | 7a   | 7b   | 8a   | 8b   |
| Odd nozzles  | 1000 | 1000 | 1000 | 1000 | 1000 | 1000 | 1000 | 600  |
| Even nozzles | 1000 | 1000 | 1000 | 1000 | 1000 | 1000 | 1000 | 600  |

These weights will correspond to a certain percentage of usage:

| Swath band   | 1a   | 1b   | 2a   | 2b   | 3a   | 3b   | 4a   | 4b   |
|--------------|------|------|------|------|------|------|------|------|
| Odd nozzles  | 60%  | 106% | 106% | 106% | 106% | 106% | 106% | 106% |
| Even nozzles | 60%  | 106% | 106% | 106% | 106% | 106% | 106% | 106% |
| Swath band   | 5a   | 5b   | 6a   | 6b   | 7a   | 7b   | 8a   | 8b   |
| Odd nozzles  | 106% | 106% | 106% | 106% | 106% | 106% | 106% | 60%  |
| Even nozzles | 106% | 106% | 106% | 106% | 106% | 106% | 106% | 60%  |

Note that the remaining 40% of usage that '1a' does not do, is absorbed by all the other bands, from '2a' to '8a'. The same happens with '1b' to '7b': they absorb the remaining 40% of usage that we removed from '8b'. Because both '1a' and '8b' have the same weight, all the remaining bands result in the same percentage of usage, 106%. This is very important, because it provides smoothness to the mask. More of it appears in the next examples.

When this mask is used for printing, ink density will look like a stair step function, with 16 steps, therefore making the same impression as if we were using a 16-pass printmode.

Figure 8:
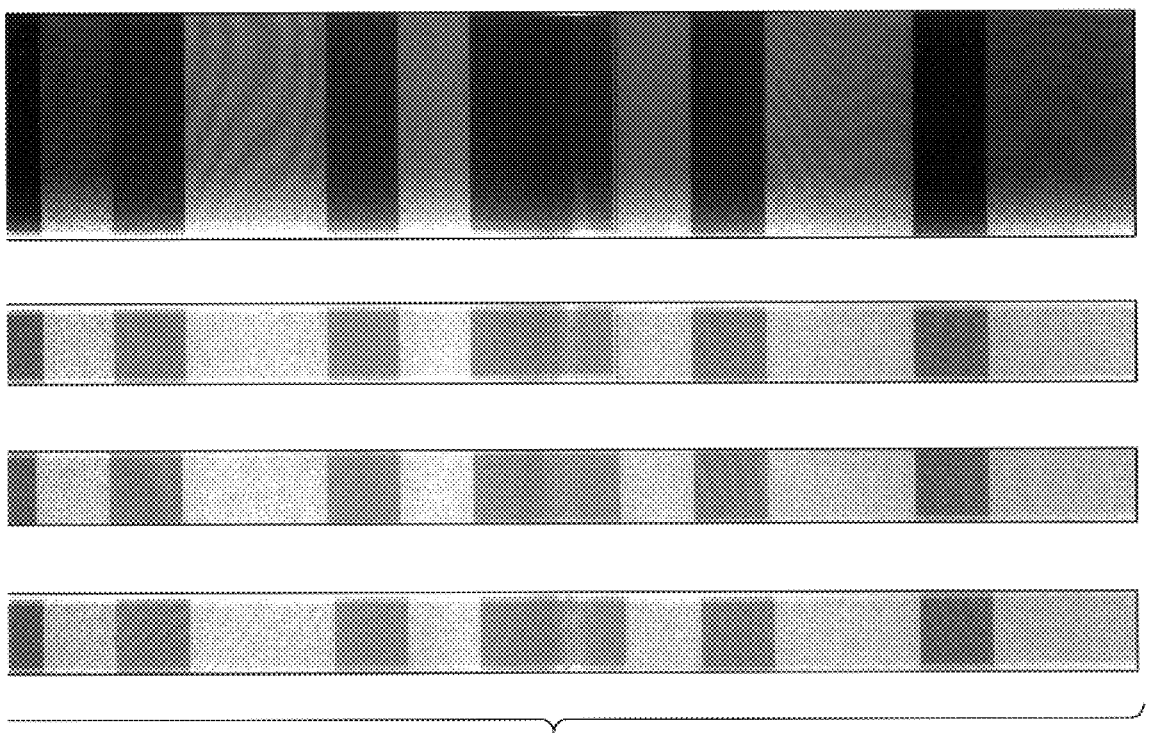
FIG. 8 is a specimen printout corresponding to "example one" (in the "Detailed Description" section of this document)—with nozzle weighting compensated in complementary patterns according to the present invention.
Figure 9:
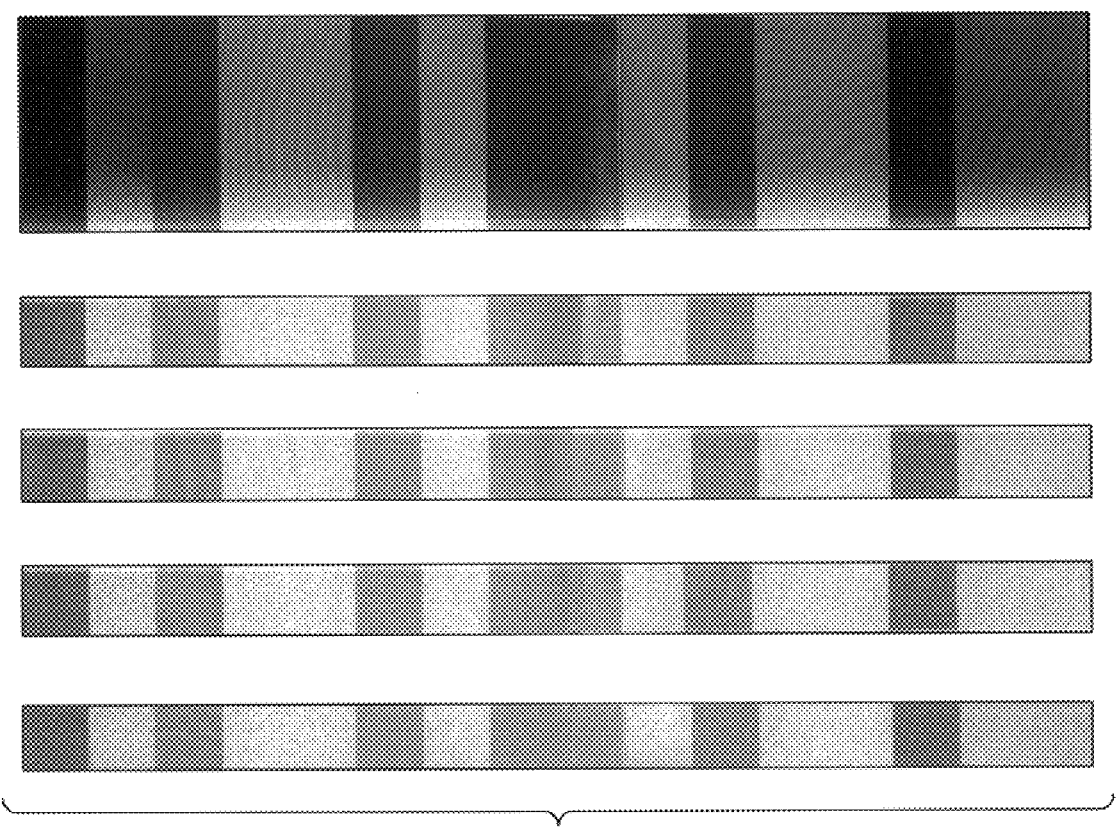
FIG. 9 is a like specimen printout but with the nozzle weighting not compensated.

A real sample of example one appears as FIG. 8, and a counter example, in which nozzle weighting is not compensated, as FIG. 9. Note stripes of different densities in the print-mask that do not appear in FIG. 8. Also note the apparent 16-pass printing in FIG. 8 (this is what the user will see while the machine is printing), versus the default 8-pass appearance shown in FIG. 9.

EXAMPLE TWO

6-Pass Mask that Minimizes Swath-Boundary Coalescence

This is a very similar example, but the goal is to make this one look like an 18-pass printmode. We must then break the mask up into 6×3×2 horizontal bands, standing for 6 passes, having 3× apparent banding frequency and specifying separately the odd from the even nozzles.

Again, the process might start by assigning weights to each band:

| Swath Band | 1a | 1b | 1c | 2a | 2b | 2c |
|---|---|---|---|---|---|---|
| Odd nozzles | 200 | 500 | 1000 | 1000 | 1000 | 1000 |
| Even nozzles | 300 | 500 | 1000 | 1000 | 1000 | 1000 |
| Swath band | 3a | 3b | 3c | 4a | 4b | 4c |
| Odd nozzles | 1000 | 1000 | 1000 | 1000 | 1000 | 1000 |
| Even nozzles | 1000 | 1000 | 1000 | 1000 | 1000 | 1000 |
| Swath band | 5a | 5b | 5c | 5a | 6b | 6c |
| Odd nozzles | 1000 | 1000 | 1000 | 6000 | 500 | 200 |
| Even nozzles | 1000 | 1000 | 1000 | 1000 | 500 | 200 |

These weights will correspond to a certain percentage of usage:

| Swath Band | 1a | 1b | 1c | 2a | 2b | 2c |
|---|---|---|---|---|---|---|
| Odd nozzles | 20 | 50% | 116% | 116% | 125% | 116% |
| Even nozzles | 20 | 50% | 116% | 116% | 125% | 116% |
| Swath band | 3a | 3b | 3c | 4a | 4b | 4c |
| Odd nozzles | 116% | 125% | 116% | 116% | 125% | 116% |
| Even nozzles | 116% | 125% | 116% | 116% | 125% | 116% |
| Swath band | 5a | 5b | 5c | 6a | 6b | 6c |
| Odd nozzles | 116% | 125% | 116% | 116% | 50% | 20% |
| Even nozzles | 116% | 125% | 116% | 116% | 50% | 20% |

Again, '1a' determines a 116% usage for the rest of 'a' bands, and '6c' determines also a 116% usage for the rest of 'c' bands. But '1b' and '6b' determine a 125% usage for the rest of the 'b' bands. This change has broken the mask evenness, introducing 10 artifacts. Here the mask weighting must be done accurately, in order to insure a perfectly smooth mask.

Following the present invention, the above 6-pass mask is not correct. In order to make it right, '1b' and '6b' must be weighted to 580, that the 32% less usage of '1b', added to the 32% less usage of '6b' is absorbed, by the 116% usage of '2b' to '5b':

| Swath Band | 1a | 1b | 1c | 2a | 2b | 2c |
|---|---|---|---|---|---|---|
| Odd nozzles | 200 | 680 | 1000 | 1000 | 1000 | 1000 |
| Even nozzles | 200 | 680 | 1000 | 1000 | 1000 | 1000 |
| Swath band | 3a | 3b | 3c | 4a | 4b | 4c |
| Odd nozzles | 1000 | 1000 | 1000 | 1000 | 1000 | 1000 |

-continued

| | | | | | | |
|---|---|---|---|---|---|---|
| Even nozzles | 1000 | 1000 | 1000 | 1000 | 1000 | 1000 |
| Swath band | 5a | 5b | 5c | 5a | 6b | 6c |
| Odd nozzles | 1000 | 1000 | 1000 | 6000 | 680 | 200 |
| Even nozzles | 1000 | 1000 | 1000 | 1000 | 680 | 200 |

Percent usage:

| Swath Band | 1a | 1b | 1c | 2a | 2b | 2c |
|---|---|---|---|---|---|---|
| Odd nozzles | 20 | 50% | 116% | 116% | 116% | 116% |
| Even nozzles | 20 | 50% | 116% | 116% | 116% | 116% |
| Swath band | 3a | 3b | 3c | 4a | 4b | 4c |
| Odd nozzles | 116% | 116% | 116% | 116% | 116% | 116% |
| Even nozzles | 116% | 116% | 116% | 116% | 116% | 116% |
| Swath band | 5a | 5b | 5c | 6a | 6b | 6c |
| Odd nozzles | 116% | 116% | 116% | 116% | 50% | 20% |
| Even nozzles | 116% | 116% | 116% | 116% | 50% | 20% |

EXAMPLE THREE

8-Pass Mask with Printhead Usage Compensation

This is the same as example one except that here it has been detected that a certain region of the printhead is performing worse.

The detection can be achieved by several means:

A hardware device made up of an infrared LED and a sensor. The resulting reading can be correlated not only to the fact that a nozzle is firing or not, but also to the consistency or the trajectory of the fired drop.

By directly printing with the printhead, and scanning on the paper to detect regions of lighter color.

Therefore, as a result of one or both of the methods described above, let the poor-performing region be '3a-odd', and assume lowering of its weight to 800:

| Swath band | 1a | 1b | 2a | 2b | 3a | 3b | 4a | 4b |
|---|---|---|---|---|---|---|---|---|
| Odd nozzles | 600 | 1000 | 1000 | 1000 | 800 | 1000 | 1000 | 1000 |
| Even nozzles | 600 | 1000 | 1000 | 1000 | 1000 | 1000 | 1000 | 1000 |
| Swath band | 5a | 5b | 6a | 6b | 7a | 7b | 8a | 8b |
| Odd nozzles | 1000 | 1000 | 1000 | 1000 | 1000 | 1000 | 1000 | 600 |
| Even nozzles | 1000 | 1000 | 1000 | 1000 | 1000 | 1000 | 1000 | 600 |

These weights will correspond to the following percentages of usage:

| Swath band | 1a | 1b | 2a | 2b | 3a | 3b | 4a | 4b |
|---|---|---|---|---|---|---|---|---|
| Odd nozzles | 60% | 106% | 116% | 106% | 80% | 106% | 116% | 106% |
| Even nozzles | 60% | 106% | 106% | 106% | 106% | 106% | 106% | 106% |
| Swath band | 5a | 5b | 6a | 6b | 7a | 7b | 8a | 8b |
| Odd nozzles | 116% | 106% | 116% | 106% | 116% | 106% | 116% | 60% |
| Even nozzles | 106% | 106% | 106% | 106% | 106% | 106% | 106% | 60% |

Again, the smoothness of the mask has been broken. This is because some weights are complementary, and to keep the mask smooth, they must always be modified by pairs. In this case, this calls for decreasing the weight of one 'b-even' band. Consider what happens when '5b-even' goes down to 800:

| Swath band   | 1a   | 1b   | 2a   | 2b   | 3a   | 3b   | 4a   | 4b   |
|---|---|---|---|---|---|---|---|---|
| Odd nozzles  | 600  | 1000 | 1000 | 1000 | 800  | 1000 | 1000 | 1000 |
| Even nozzles | 600  | 1000 | 1000 | 1000 | 1000 | 1000 | 1000 | 1000 |
| Swath band   | 5a   | 5b   | 6a   | 6b   | 7a   | 7b   | 8a   | 8b   |
| Odd nozzles  | 1000 | 1000 | 1000 | 1000 | 1000 | 1000 | 1000 | 600  |
| Even nozzles | 1000 | 800  | 1000 | 1000 | 1000 | 1000 | 1000 | 600  |

These weights will correspond to the following percentage of usages:

| Swath band   | 1a   | 1b   | 2a   | 2b   | 3a   | 3b   | 4a   | 4b   |
|---|---|---|---|---|---|---|---|---|
| Odd nozzles  | 60%  | 106% | 116% | 106% | 80%  | 106% | 116% | 106% |
| Even nozzles | 60%  | 116% | 106% | 116% | 106% | 116% | 106% | 116% |
| Swath band   | 5a   | 5b   | 6a   | 6b   | 7a   | 7b   | 8a   | 8b   |
| Odd nozzles  | 116% | 106% | 116% | 106% | 116% | 106% | 116% | 60%  |
| Even nozzles | 106% | 80%  | 106% | 116% | 106% | 116% | 106% | 60%  |

This way, most of the bands have a usage of either 116%/106% or 106%/116%, which results in a smooth mask.

Recap

The invention divides masks into multiple bands, and assigns a single usage percentage to all the nozzles in each band. In order to achieve maximum mask smoothness, whenever a swath band is weighted below nominal. To double the apparent frequency, 'a-even' and 'b-odd' are complementary, as well as 'a-odd' and 'b-even'. The same philosophy applies to 3× and 4× apparent frequencies, although complementary is not so simple a rule. What also may appear is a simple mathematical rule that establishes exactly the weight for each complementary band.

The method to operate is first to assign low weights to those printhead regions that must address coalescence problems, or to those regions of the pen that have been detected performing poorly. Then additional, complementary low weights are assigned, in order to compensate for mask smoothness.

In each of the accompanying FIGS. 8 and 9, the relatively tall multicolor bands across the top are complete printouts such as produced by assembling the several 2½ cm (1 inch) swaths printed separately below. Two observations can be made from these panels.

First, in the complementary-weighted specimen of FIG. 8, along the top and bottom of each of the individual 2½ cm swaths appear balanced very thin (shallow) light strips. In the specimen printed without complementary weighting, in FIG. 9, a like thin light strip appears only along the top of each 2½ cm swath. This illustrates directly—although only for the swath edges rather than internally the complementary character of the innovation.

Second, in the complementary-weighted FIG. 8, almost all of the solid color fields appear smooth; whereas in the FIG. 9 specimen without complementary weighting, horizontal striations appear across almost all of the solid fields. This effect is clear in the original color printouts, but may not be so in published reproductions.

Figure 12:
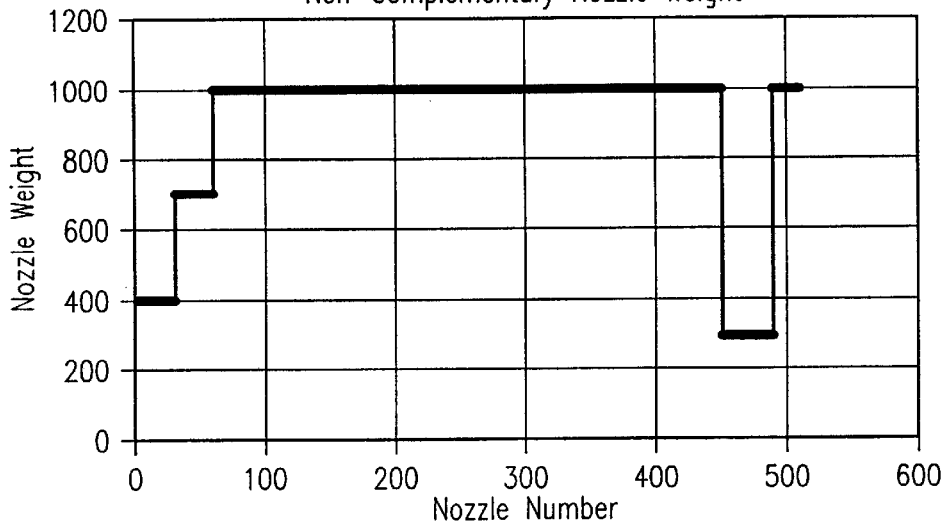
FIG. 12 is a graph of nozzle weights vs. nozzle number (i. e. position along the length of the print-element array), with the weights complementarily compensated in accordance with preferred embodiments of the invention.
Figure 13:
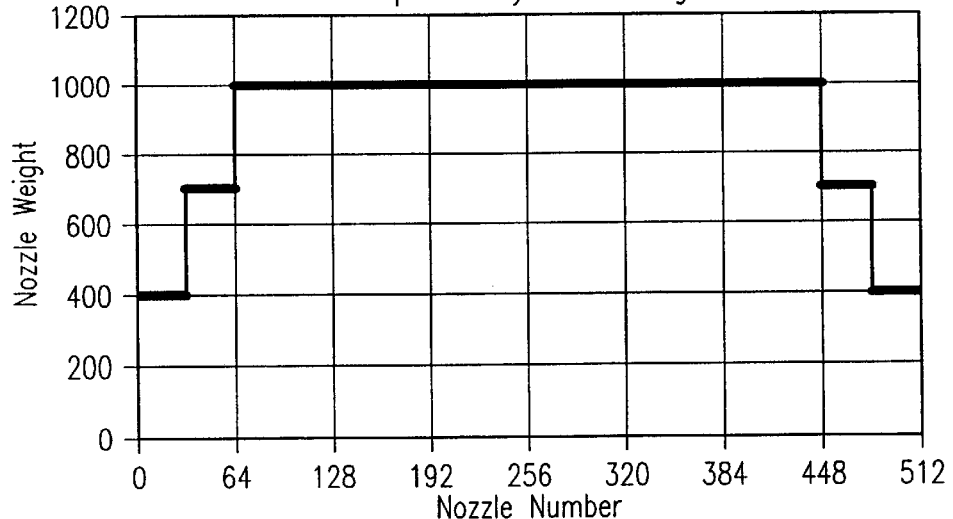
FIG. 13 is a like graph for weights that are not complementarily compensated.

Because of this latter difficulty, some other illustrations of the working invention are also included. FIGS. 12 and 13 show actual weight data for a printhead that was automatically given complementary weights, demonstrating directly how the system is capable of improving balance or symmetry.

Figure 14:
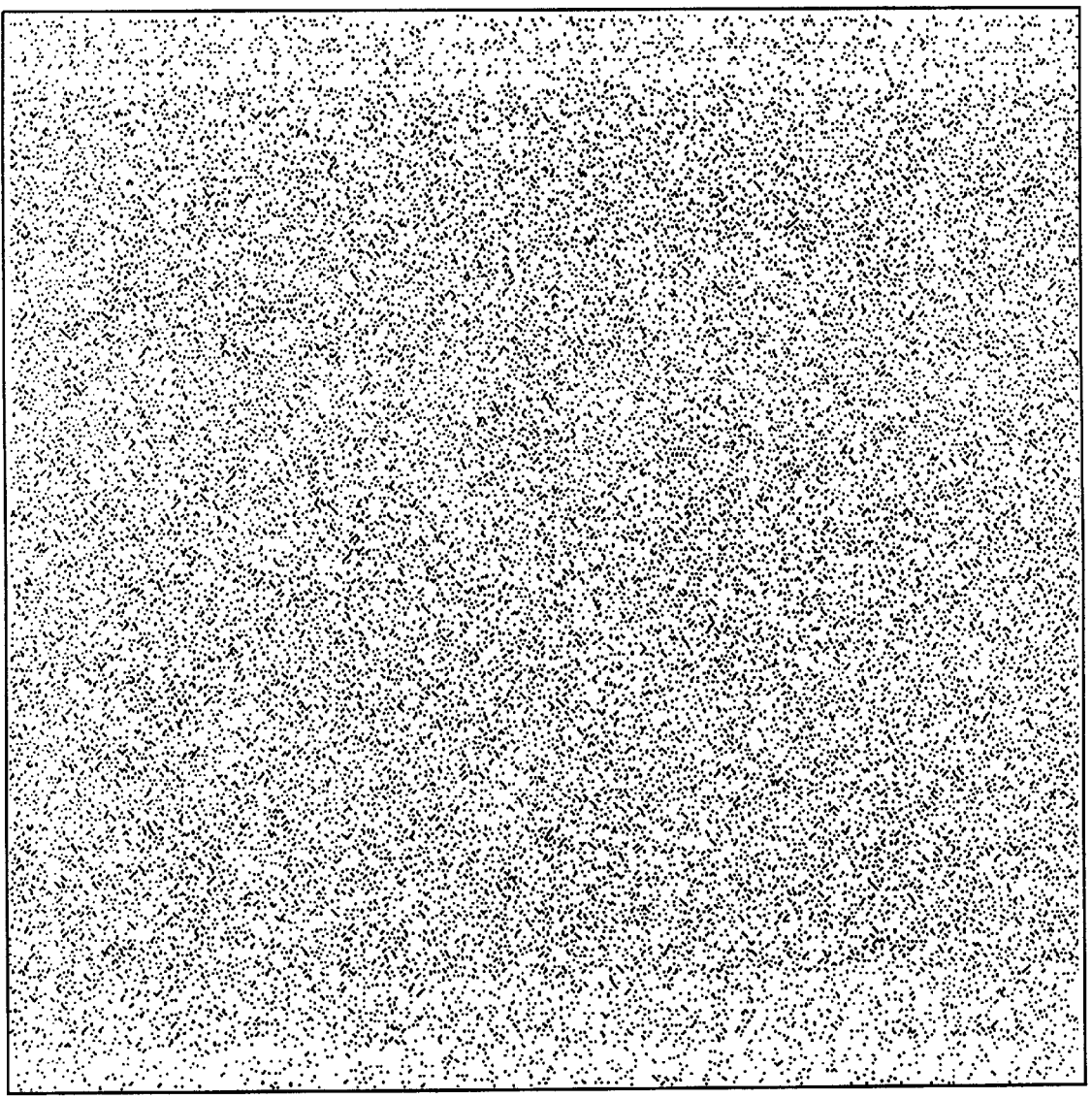
FIG. 14 is a simulated printout, corresponding very generally to FIG. 8—with complementary nozzle weights.
Figure 15:
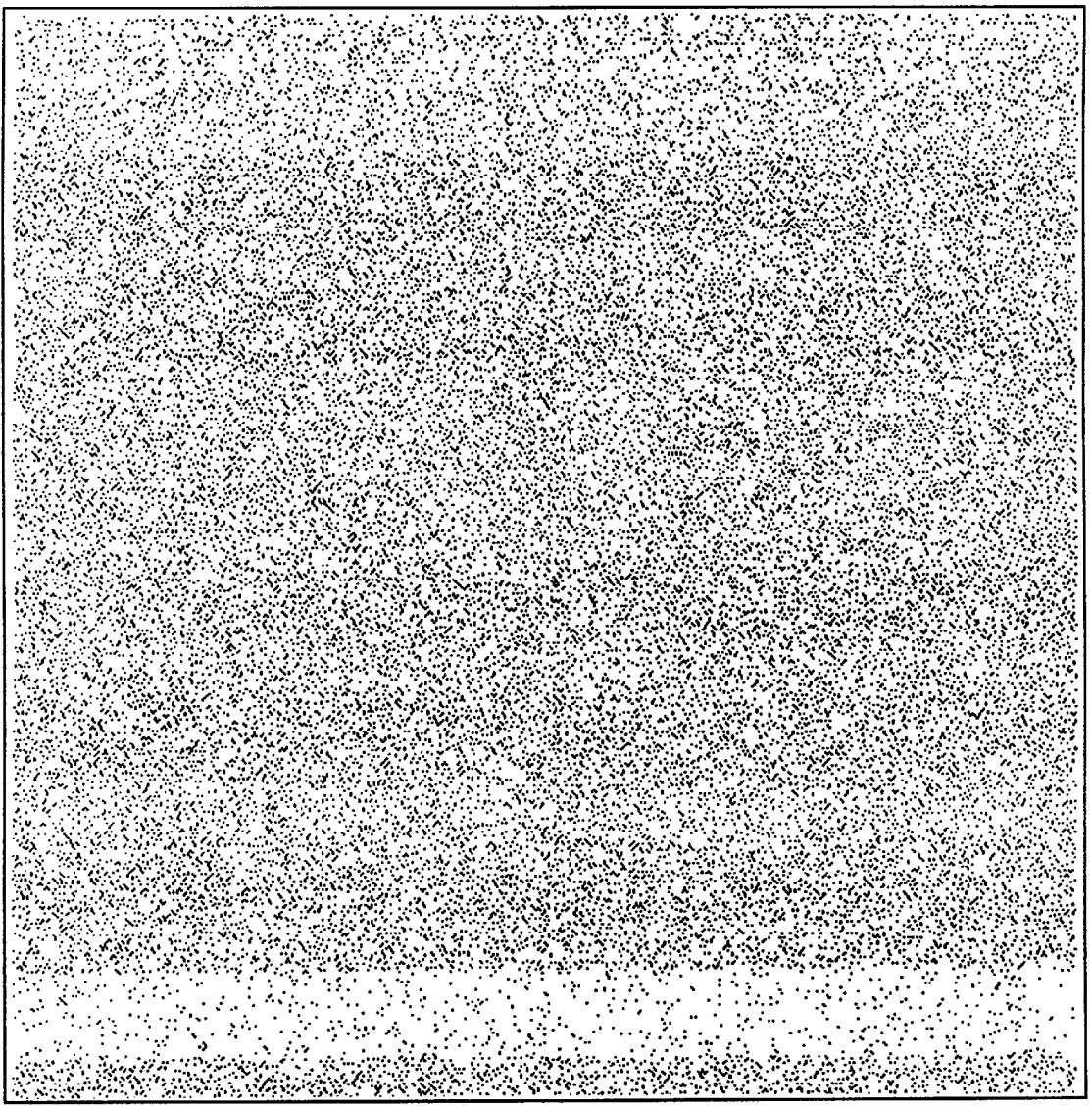
FIG. 15 is a like simulation without complementary weighting.

FIGS. 14 and 15 are comparable to FIGS. 8 and 9 but are simulations, for a very strongly enlarged small segment of a single swath—rather than actual printouts. Electronic simulations of the masking process do not take into account nonlinearities introduced by e. g. each drop of ink expanding on the media, interacting with neighboring drops etc.; however, as they are in black-and-white and very greatly enlarged, they may be helpful in appreciating the differences in performance.

The invention helps to enable meaningful use of portions of each printing-element array that are performing below nominal—but to do so without making the resulting relatively substandard performance needlessly conspicuous. The printout can be made to appear as if there were, for example, twice as many passes as actually there are—as set forth particularly in the companion Zapata document.

The mask can be changed, and automatically, according to the health of pen. Output quality improves because error is better distributed.

4. Hardware and Program Implementations of the Invention

Figure 10:
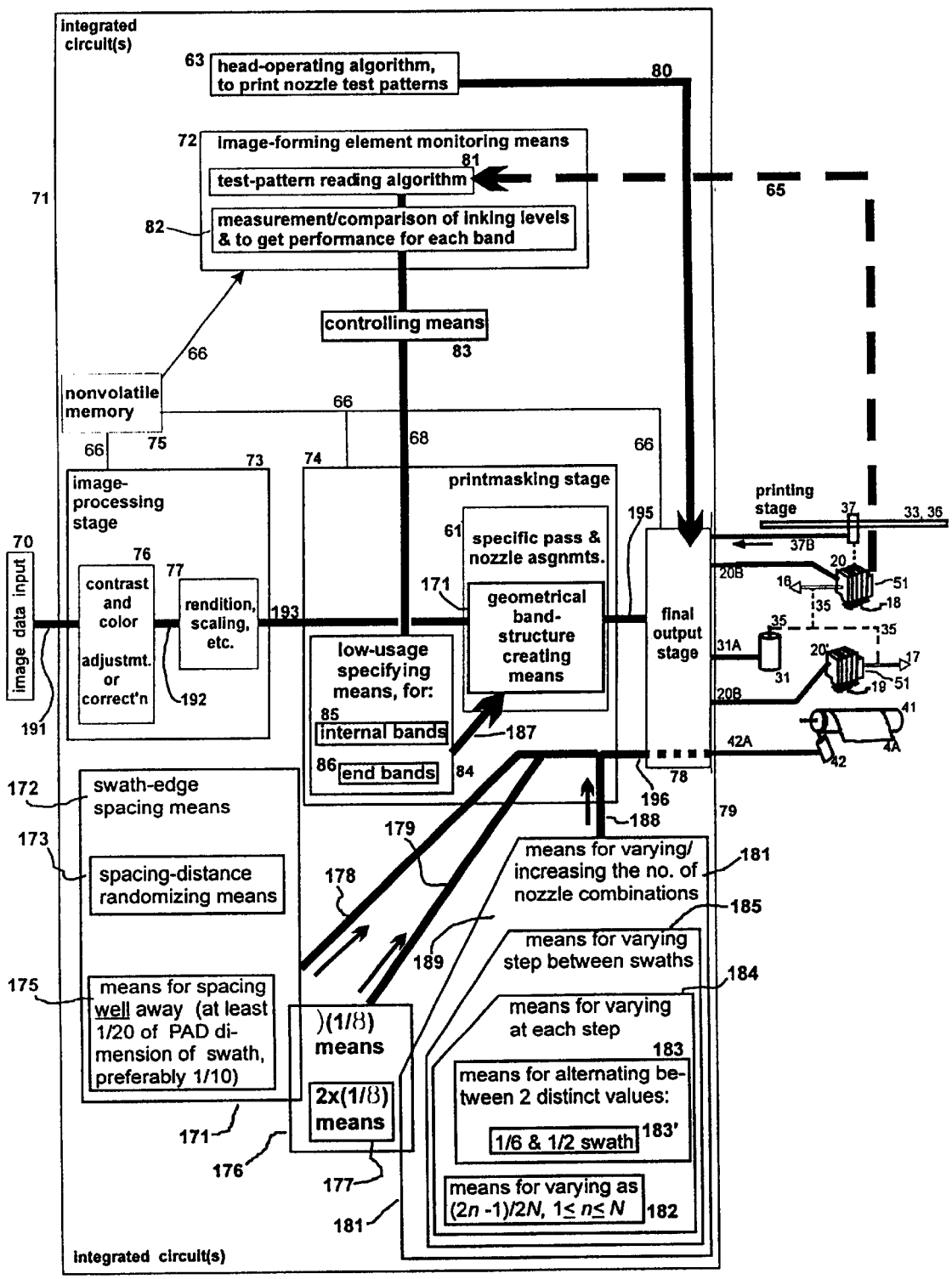
FIG. 10 is a schematic block diagram, focusing upon the functional blocks within the program-performing circuits of the preferred embodiment.

Before discussion of details in the block diagrammatic showing of FIG. 10, a general orientation to that drawing will be offered. In FIG. 10, most portions 70, 73,75–78 across the center, including the printing stage 4A-51 at far right, are generally conventional and represent the context of the invention in an inkjet printer/plotter.

The lower portions 171–188 of FIG. 10 represent most of the concepts introduced in the related Zapata document, and serving here both as a representative implementation of the present invention and also as an inventive combination with the unique features of the present invention. In this lower section the three main blocks 171, 176, 181 are drawn overlapping to symbolize the conceptually overlapped character of functions in these blocks.

The swath-edge spacing means 171, wavenumber (1/λ) varying means 176, and nozzle-combination varying or increasing means 181 are most preferably integrated with one another, so that these features of the invention are practiced in combination together. As the drawing is crowded, the accepted wavenumber symbol "1/λ" has been used to represent spatial frequency, "Δ" to represent variation, and "2>" to represent doubling. Accordingly the spatial-frequency varying means 176 appear labeled as Δ(1/λ) and the preferred spatial-frequency doubling means 177 as 2×(1/λ). These and the adjacent parts of the drawing are discussed in detail in the Zapata document and are believed to be generally self explanatory, and hence will not be further detailed here.

The remaining central portions 170 and the upper portions of FIG. 10 relate to the present invention particularly. These portions are discussed below.

Now turning to details, the pen-carriage assembly is represented separately at 20 (FIG. 10) when traveling to the left 16 while discharging ink 18, and at 20' when traveling to the right 17 while discharging ink 19. It will be understood that both 20 and 20' represent the same pen carriage.

The previously mentioned digital processor 71 provides control signals 20B to fire the pens with correct timing, coordinated with platen drive control signals 42A to the platen motor 42, and carriage drive control signals 31A to the carriage drive motor 31. The processor 71 develops these carriage drive signals 31A based partly upon information about the carriage speed and position derived from the encoder signals 37B provided by the encoder 37.

(In the block diagram all illustrated signals are flowing from left to right except the information 37B fed back from the sensor—as indicated by the associated leftward arrow.) The codestrip 33 thus enables formation of color inkdrops at ultrahigh precision during scanning of the carriage assembly 20 in each direction—i. e., either left to right (forward 20') or right to left (back 20).

New image data 70 are received 191 into an image-processing stage 73, which may conventionally include a contrast and color adjustment or correction module 76 and a rendition, scaling etc. module 77.

Information 193 passing from the image-processing modules next enters a printmasking module 74, typically including a stage 61 for specific pass and nozzle assignments. The latter stage 61 performs generally conventional functions, but in accordance with certain aspects of the present invention particularly includes means 171 for defining or creating a geometrical band structure.

The band structure established in the creating means 171 is conditioned or configured 187 by "low-usage specifying means" 84, which according to the present invention particularly and primarily includes means 85 for specifying internal bands whose condition calls for low usage though like means 86 for specifying end bands are preferably also included.

Information for driving the specifying means is derived by a module 63 that controls 80 the final output stage 78 to print nozzle test patterns for reading by the sensor 51, FIG. 10 (or if preferred to eject inkdrops selectively into an optical detector, not shown, that senses the drops directly, e. g. while in flight). The resulting sensor signal 65 is monitored in a monitoring module 72.

That module operates according to a program 81 for reading the sensor signal, and another program stage 82 that measures the signals, and compares some signals with others, to determine inking levels and thereby determine the performance for each band of the printheads. The results of these measurements are massaged in a control stage 83, deriving an operating signal 68 for the previously introduced specifying means 84.

The means represented by the several operational blocks 63, 72, 83, 61, 84 of the present invention—as well as the conventional modules 73, 74, 74, 78, and also the swath-characteristic-varying functions 171, 176, 181 as shown—are implemented within integrated circuits 71. Given the statements of function and the swath diagrams presented in this document, an experienced programmer of ordinary skill in this field can prepare suitable programs for operation of the circuits.

As is well known, the integrated circuits 71 may be part of the printer itself, as for example an application-specific integrated circuit (ASIC), or may be program data in a read-only memory (ROM)—or during operation may be parts of a programmed configuration of operating modules in the central processing unit (CPU) of a general-purpose computer that reads instructions from a hard drive.

Most commonly the circuits are shared among two or more of these kinds of devices. Most modernly, yet another alternative is a separate stand-alone product, such as for example a so-called "raster image processor" (RIP), used to avoid overcommitting either the computer or the printer.

Figure 11:
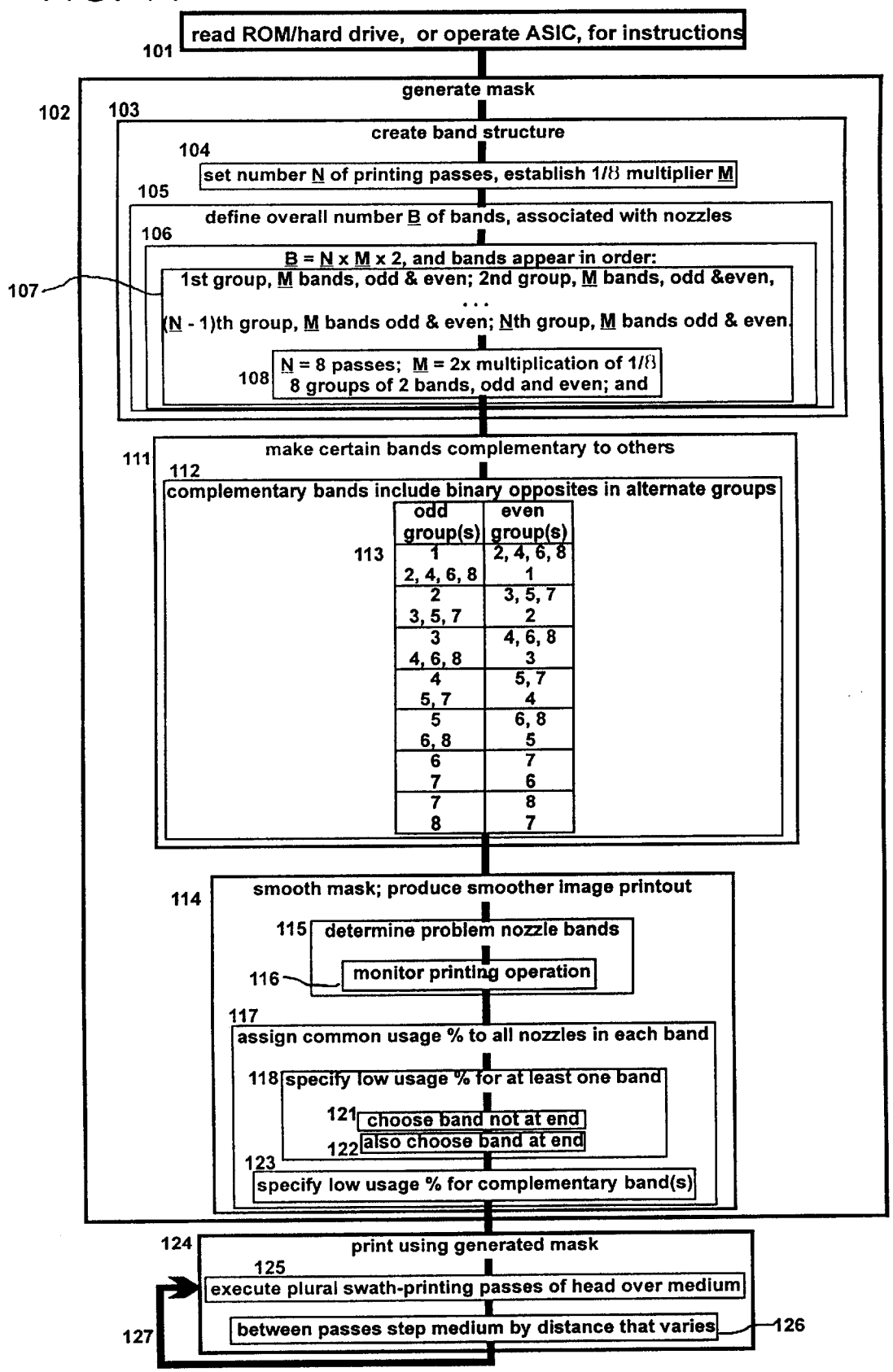
FIG. 11 is a program flow chart illustrating operation of preferred embodiments for some method aspects of the invention.

In operation the system first retrieves 101 (FIG. 11) its operating program appropriately—i. e., by reading instructions from memory in case of a firmware or software implementation, or by simply operating dedicated hardware in case of an ASIC or like implementation. Once prepared or initialized in this way, the method proceeds to generation 102 of a printmask—through three major substeps of band-structure creation 103, establishment of the complements 111, and smoothing 114 based upon measurement 115 of nozzle performance. Finally the apparatus proceeds with printing 124, through iteration 127 of the operational steps 125, 126. In view of the foregoing it is believed that the person skilled in this field will find the details of FIG. 11 self explanatory.

The above disclosure is intended as merely exemplary, and not to limit the scope of the invention—which is to be determined by reference to the appended claims.

What is claimed is:

1. A method of generating a printmask for incremental printing of an image, said printing using image-forming elements in an array; said method comprising the steps of:

creating a structure of bands, respectively associated with the image-forming elements and constituting the printmask, wherein certain specific bands within the band structure are complementary to other specific bands within the band structure;

specifying a relatively low usage percentage for at least one particular band; and specifying a like relatively low usage percentage for another band that is respectively complementary to each said at least one particular band.

2. The method of claim 1, wherein the creating step comprises:

setting a number N of actual printing passes desired;

establishing an effective spatial-frequency multiplier M desired for the image;

defining an overall number B of bands, associated with the image-forming elements and constituting the printmask, said number B being equal to the product B=N×M×2, wherein the numeral "2" accounts for the presence of odd and even image-forming elements, and wherein the bands appear in the printmask in the order:

first group of M bands, odd and even, second group of M bands, odd and even, next group of M bands, odd and even,

. . .

next group of M bands, odd and even, (N−1)th group of M bands, odd and even,

Nth group of M bands, odd and even.

3. The method of claim 2, wherein:

the complementary bands include bands that are binary opposites and in alternate groups of the created band structure.

4. The method of claim 3, wherein:

there are N=8 passes;

there is M=2 spatial-frequency multiplication;

there are therefore 8 groups of 2 bands, odd and even; and complementary bands include:

the first group, odd, and the second, fourth, sixth and eighth groups, even;

the first group, even, and the second, fourth, sixth and eighths groups, odd;

the second group, odd, and the third, fifth and seventh groups, even;

the second group, even, and the third, fifth and seventh groups, odd;

the third group, odd, and the fourth, sixth and eighth groups, even;

the third group, even, and the fourth, sixth and eighth groups, odd;

the fourth group, odd, and the fifth and seventh groups, even;

the fourth group, even, and the fifth and seventh groups, odd;

the fifth group, odd, and the sixth and eighth groups, even;

the fifth group, even, and the sixth and eighth groups, odd;

the sixth group, odd, and the seventh group, even;

the sixth group, even, and the seventh group, odd;

the seventh group, odd, and the eighth group, even;

the seventh group, even, and the eighth group, odd.

5. The method of claim 1, wherein:

the like-low-percentage specifying step tends to smooth the mask and produce smoother output printing of the image.

6. The method of claim 1, wherein:

the at least one particular band is associated with image-forming elements known to be problematic in operation.

7. The method of claim 6, wherein:

the at least one particular band is chosen substantially independent of location of the image-forming elements in the array.

8. The method of claim 6, further comprising the step of:

monitoring printing operation to identify bands that are problematic in operation.

9. The method of claim 1, wherein:

the at least one particular band comprises a band that is associated with image-forming elements which are not at either end of the array.

10. The method of claim 9, wherein:

the at least one particular band further comprises a band that is associated with image-forming elements at at least one end of the array.

11. The method of claim 1, comprising the step of:

assigning a common usage percentage to all the image-forming elements associated with each band, respectively; and wherein said assigning step comprises said two specifying steps.

12. A method for printing an image using a printmask generated by the method of claim 1; said printing method comprising:

executing plural passes of a printhead over a printing medium, each pass forming a swath of marks on the medium; and between printing passes of the printhead, stepping the printing medium by a step distance that varies as between steps.

13. Apparatus for generating and using a printmask for incremental printing of an image, said printing using image-forming elements in an array and said array having two ends; said apparatus comprising:

means for creating a geometrical structure of bands, respectively associated with the image-forming elements and constituting the printmask;

means for specifying a relatively low usage percentage for at least one particular band that is associated with image-forming elements that are not at either of the ends of the array; and means for applying the printmask in said printing.

14. The apparatus of claim 13, further comprising:

means for monitoring operation of the image-forming elements;

means, responsive to the monitoring means, for identifying image-forming elements whose operation is problematic and for controlling the specifying means to specify a band associated with said problematic-operation image-forming elements as said at least one particular band.

15. The apparatus of claim 14, further comprising:

means for specifying a relatively low usage percentage for at least one particular band that is associated with image-forming elements that are at one or the other of the ends of the array.

16. The apparatus of claim 13, further comprising:

means defining an optimized multipass printmode having nonconstant media advance among passes; and wherein said optimized multipass printmode utilizes said printmask.

17. The apparatus of claim 16, for forming such image on a printing medium, and further comprising:

a printhead; and means for passing the printhead over such medium multiple times, each pass forming a swath of marks on such medium; and means associated with the printmask for spacing edges of each swath well away from edges of substantially every other swath so that substantially no two swath edges coincide on such medium.

* * * * *